US006117189A

United States Patent [19]

Reinehr et al.

[11] Patent Number: 6,117,189

[45] **Date of Patent: *Sep. 12, 2000**

[54] PROTECTIVE METHOD

[75] Inventors: Dieter Reinehr, Kandern, Germany; Peter Fankhauser, Ettingen, Switzerland; Claude Eckhardt, Riedisheim, France

[73] Assignee: Ciba Specialty Chemicals Corporation, Tarrytown, N.Y.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/438,591

[22] Filed: May 10, 1995

[30] Foreign Application Priority Data

May 12, 1994 [GB] United Kingdom .................. 9409465

[51] Int. Cl.[7] .............................. C11D 3/42; D06M 11/00

[52] U.S. Cl. .............................. 8/111; 8/137; 252/301.21; 252/301.22; 252/301.23; 252/301.24; 252/301.25; 252/301.27; 252/301.28; 252/301.29; 252/301.32; 501/301; 501/302; 501/303; 501/307; 501/324; 501/325; 427/160; 427/384; 442/130; 442/131; 442/133

[58] Field of Search .................. 8/137, 111; 252/301.23, 252/301.21, 95, 96, 98, 103, 174.21, 174.14, 174.19, 553, 549, 550, 174.25, 551, 135, 545, 109, 301.22, 301.24, 301.25, 301.27, 301.28, 301.29, 301.32; 510/301, 302, 303, 307, 324, 325; 427/160, 384; 442/130, 131, 133

[56] References Cited

U.S. PATENT DOCUMENTS

| | | | |
|---|---|---|---|
| 3,706,671 | 12/1972 | Hardy | 8/111 |
| 4,009,193 | 2/1977 | Scheuermann et al. . | |
| 4,309,316 | 1/1982 | Lange et al. . | |
| 4,339,393 | 7/1982 | Lühti et al. . | |
| 4,384,121 | 5/1983 | Meyer | 548/217 |
| 4,460,485 | 7/1984 | Rapisarda et al. . | |
| 4,478,598 | 10/1984 | Meyer et al. | 8/648 |
| 4,539,161 | 9/1985 | Guglielmetti . | |
| 4,562,002 | 12/1985 | Neiditch et al. . | |
| 4,717,502 | 1/1988 | Sehmid | 252/301.23 |
| 4,772,404 | 9/1988 | Fox et al. . | |
| 5,082,578 | 1/1992 | Langer et al. . | |
| 5,145,991 | 9/1992 | Weber et al. | 562/87 |
| 5,164,100 | 11/1992 | Langer et al. . | |
| 5,688,758 | 11/1997 | Reinehr et al. | 510/516 |
| 5,800,862 | 9/1998 | Kaufmann et al. | 427/458 |

FOREIGN PATENT DOCUMENTS

| | | |
|---|---|---|
| 0029003 | 5/1981 | European Pat. Off. . |
| 0074590 | 3/1983 | European Pat. Off. . |
| 0132138 | 1/1985 | European Pat. Off. . |
| 0192600 | 8/1986 | European Pat. Off. . |
| 0240461 | 10/1987 | European Pat. Off. . |
| 0275694 | 7/1988 | European Pat. Off. . |
| 0359039 | 3/1990 | European Pat. Off. . |
| 0508744 | 10/1992 | European Pat. Off. . |
| 509787 | 10/1992 | European Pat. Off. . |
| 0583888 | 2/1994 | European Pat. Off. . |
| 57-2399 | 1/1982 | Japan . |
| 1269449 | 4/1972 | United Kingdom . |
| 1353690 | 5/1974 | United Kingdom . |
| 1354382 | 5/1974 | United Kingdom . |
| 1508153 | 4/1978 | United Kingdom . |
| 2158454 | 11/1985 | United Kingdom . |
| WO/9404515 | 3/1994 | WIPO . |
| 94/11480 | 5/1994 | WIPO . |

OTHER PUBLICATIONS

Derwent Abstract XP–002062576, Oct. 1984.

Derwent Abstract XP–002062578, Nov. 1993.

Derwent Abstract XP–002069893, Jul. 1991.

Derwent Abstract 90–084495, Mar. 1990.

Derwent Abstract, WPI 82–12702E/07 (JP57002399), Jan. 1982.

*Primary Examiner*—Alan Diamond
*Attorney, Agent, or Firm*—Kevin T. Mansfield

[57] ABSTRACT

The present invention relates to a method for the improvement of the sun protection factor (SPF) of textile fiber material, comprising applying to the textile fiber material a detergent comprising at least one fluorescent whitening agent, which absorbs radiation in the wavelength range 280–400 nm, preferably by washing the textile fiber material with a detergent containing said fluorescent whitening agent.

20 Claims, No Drawings

PROTECTIVE METHOD

The present invention relates to a method for the improvement of the sun protection factor (SPF) of textile fibre material, comprising applying to the textile fibre material a detergent comprising at least one fluorescent whitening agent, which absorbs radiation in the wavelength range 280–400 nm, preferably by washing the textile fibre material with a detergent containing said fluorescent whitening agent.

It is known that light radiation of wavelengths 280–400 nm permits tanning of the epidermis. Also known is that rays of wavelengths 280–320 nm (termed UV-B radiation), cause erythemas and skin burning which can inhibit skin tanning.

Radiation of wavelengths 320–400 nm (termed UV-A radiation) is known to induce skin tanning but can also cause skin damage, especially to sensitive skin which is exposed to sunlight for long periods. Examples of such damage include loss of skin elasticity and the appearance of wrinkles, promotion of the onset of erythemal reaction and the inducement of phototoxic or photoallergic reactions.

Any effective protection of the skin from the damaging effects of undue exposure to sunlight clearly needs to include means for absorbing both UV-A and UV-B components of sunlight before they reach the skin surface.

Traditionally, protection of exposed human skin against potential damage by the UV components in sunlight has been effected by directly applying to the skin a preparation containing a UV absorber. In areas of the world, e.g. Australia and America, which enjoy especially sunny climates, there has been a great increase in the awareness of the potential hazards of undue exposure to sunlight, compounded by fears of the consequences of alleged damage to the ozone layer. Some of the more distressing embodiments of skin damage caused by excessive, unprotected exposure to sunlight are development of melanomas or carcinomas on the skin.

One aspect of the desire to increase the level of skin protection against sunlight has been the consideration of additional measures, over and above the direct protection of the skin. For example, consideration has been given to the provision of protection to skin covered by clothing and thus not directly exposed to sunlight.

Most natural and synthetic textile materials are at least partially permeable to UV components of sunlight Accordingly, the mere wearing of clothing does not necessarily provide skin beneath the clothing with adequate protection against damage by UV radiation. Although clothing containing a deeply coloured dye and/or having a tight weave texture may provide a reasonable level of protection to skin beneath it, such clothing is not practical in hot sunny climates, from the standpoint of the personal comfort of the wearer.

There is a need, therefore, to provide protection against UV radiation for skin which lies underneath clothing, including lightweight summer clothing, which is undyed or dyed only in pale shades. Depending on the nature of the dyestuff, skin covered by clothing dyed in some dark shades may also require protection against UV radiation.

Such lightweight summer clothing normally has a density of less than 200 $g/m^2$ and has a sun protection factor rating between 1.5 and 20, depending on the type of fibre from which the clothing is manufactured.

The SPF rating of a sun protectant (sun cream or clothing) may be defined as the multiple of the time taken for the average person wearing the sun protectant to suffer sun burning under average exposure to sun. For example, if an average person would normally suffer sun bum after 30 minutes under standard exposure conditions, a sun protectant having an SPF rating of 5 would extend the period of protection from 30 minutes to 2 hours and 30 minutes. For people living in especially sunny climates, where mean sun burn times are minimal, e.g. only 15 minutes for an average fair-skinned person at the hottest time of the day, SPF ratings of at least 20 are desired for lightweight clothing.

Surprisingly, it has now been found that washing a textile fibre material with a detergent containing at least one particular fluorescent whitening agent which can also serve as a UV (ultra-violet) radiation absorber, namely one which absorbs radiation in the wavelength range 280–400 nm, imparts an excellent sun protection factor to the fibre material so washed.

Accordingly, the present invention provides a method for the improvement of the sun protection factor (SPF) of textile fibre material, comprising applying to the textile fibre material a detergent comprising at least one fluorescent whitening agent, which absorbs radiation in the wavelength range 280–400 nm, preferably by washing the textile fibre material with a detergent containing said fluorescent whitening agent.

The method according to the present invention is preferably effected by washing the textile fibre material at least once with the detergent composition, preferably at a temperature ranging from 10 to 100° C., especially from 15 to 60° C.

The detergent composition used preferably comprises:

i) 5–90%, preferably 5–70% of an anionic surfactant and/or a nonionic surfactant;

ii) 5–70%, preferably 5–40% of a builder;

iii) 0–30%, preferably 1–12% of a peroxide;

iv) 0–10%, preferably 1–6% of a peroxide activator and/or 0–1%, preferably 0.1–3% of a bleaching catalyst;

v) 0.005–2%, preferably 0.01–1% of at least one fluorescent whitening agent which absorbs radiation in the wavelength range 280–400 nm; and vi) 0.005–10%, preferably 0.1–5% of of one or more auxiliaries, each by weight, based on the total weight of the detergent.

The detergent may be formulated as a solid, as an aqueous liquid comprising 5–50, preferably 10–35% water or as a non-aqueous liquid detergent, containing not more than 5, preferably 0–1 wt. % of water, and based on a suspension of a builder in an non-ionic surfactant, as described, e.g., in GB-A-2158454.

The anionic surfactant component may be, e.g., a sulphate, sulphonate or carboxylate surfactant, or a mixture of these.

Preferred sulphates are alkyl sulphates having 12–22 carbon atoms in the alkyl radical, optionally in combination with alkyl ethoxy sulphates having 10–20 carbon atoms in the alkyl radical.

Preferred sulphonates include alkyl benzene sulphonates having 9–15 carbon atoms in the alkyl radical.

In each case, the cation is preferably an alkali metal, especially sodium.

Preferred carboxylates are alkali metal sarcosinates of formula $R—CO(R^1)CH_2COOM^1$ in which R is alkyl or alkenyl having 9–17 carbon atoms in the alkyl or alkenyl radical, $R^1$ is $C_1$–$C_4$ alkyl and $M^1$ is alkali metal.

The nonionic surfactant component may be, e.g., a condensate of ethylene oxide with a $C_9$–$C_{15}$ primary alcohol having 3–8 moles of ethylene oxide per mole.

The builder component may be an alkali metal phosphate, especially a tripolyphosphate; a carbonate or bicarbonate, especially the sodium salts thereof; a silicate; an aluminosilicate; a polycarboxylate; a polycarboxylic acid; an organic phosphonate; or an aminoalkylene poly (alkylene phosphonate); or a mixture of these.

Preferred silicates are crystalline layered sodium silicates of the formula $NaHSi_mO_{2m+1}.pH_2O$ or $Na_2Si_mO_{2m+1}.pH_2O$ in which m is a number from 1.9 to 4 and p is 0 to 20.

Preferred aluminosilicates are the commercially-available synthetic materials designated as Zeolites A, B, X, and HS, or mixtures of these. Zeolite A is preferred.

Preferred polycarboxylates include hydroxypolycarboxylates, in particular citrates, polyacrylates and their copolymers with maleic anhydride.

Preferred polycarboxylic acids include nitrilotriacetic acid and ethylene diamine tetra-acetic acid.

Preferred organic phosphonates or aminoalkylene poly (alkylene phosphonates) are alkali metal ethane 1-hydroxy diphosphonates, nitrilo trimethylene phosphonates, ethylene diamine tetra methylene phosphonates and diethylene triamine penta methylene phosphonates.

Any peroxide component may be any organic or inorganic peroxide compound, described in the literature or available on the market, which bleaches textiles at conventional washing temperatures, e.g. temperatures in the range of from 5° C. to 90° C. In particular, the organic peroxides are, for example, monoperoxides or polyperoxides having alkyl chains of at least 3, preferably 6 to 20, carbon atoms; in particular diperoxydicarboxylates having 6 to 12 C atoms, such as diperoxyperazelates, diperoxypersebacates, diperoxyphthalates and/or diperoxydodecanedioates, especially their corresponding free acids, are of interest. It is preferred, however, to employ very active inorganic peroxides, such as persulphate, perborate and/or percarbonate. It is, of course, also possible to employ mixtures of organic and/or inorganic peroxides. The peroxides, especially the inorganic peroxides, are preferably activated by the inclusion of an activator such as tetraacetyl ethylenediamine or nonoyloxybenzene sulfonate. Bleaching catalysts which may be added include, e.g., enzymatic peroxide precursors and/or metal complexes. Preferred metal complexes are manganese or iron complexes such as manganese or iron phthalocyanines or the complexes described in EP-A-0 509 787.

The detergents used will usually contain one or more auxiliaries such as soil suspending agents, for example sodium carboxymethylcellulose; salts for adjusting the pH, for example alkali or alkaline earth metal silicates; foam regulators, for example soap; salts for adjusting the spray drying and granulating properties, for example sodium sulphate; perfumes; and also, if appropriate, antistatic and softening agents; such as smectite clays; enzymes, such as amylases; photobleaching agents; pigments; and/or shading agents. These constituents should, of course, be stable to any bleaching system employed.

Preferably a textile fibre material which is washed with the detergent according to the method of the present invention, contains 0.005 to 0.5%, especially 0.01 to 0.2% by weight of one or more fluorescent whitening agents which absorb radiation in the wavelength range 280–400 nm, based on the weight of the fibre material.

Preferred fluorescent whitening agents for use in the present invention are those having one of the formulae:

(1)

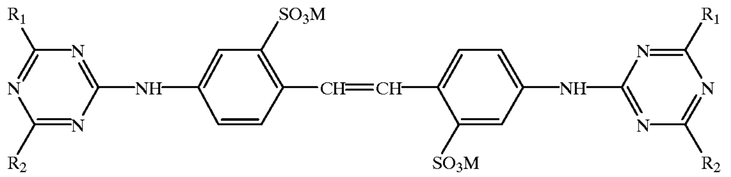

(2)

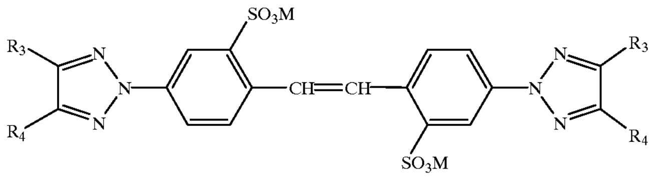

(3)

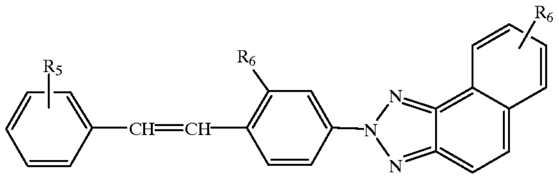

(4)

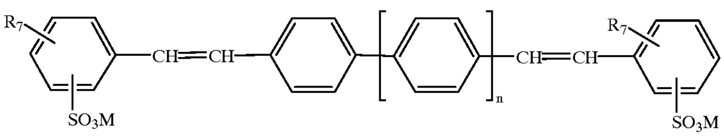

-continued (5)

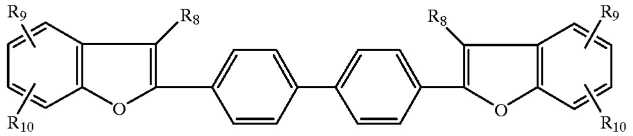

(6)

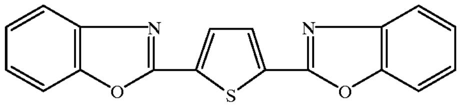

(7)

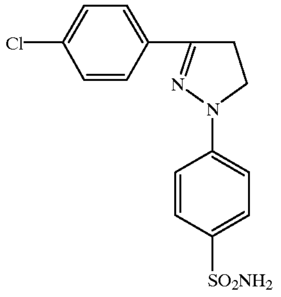

(8)

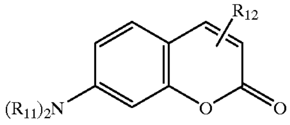

in which $R_1$ and $R_2$, independently, are OH, $NH_2$, O—$C_1$–$C_4$-alkyl, O-aryl, NH—$C_1$–$C_4$-alkyl, N($C_1$–$C_4$-alkyl)$_2$, N($C_1$–$C_4$-alkyl)($C_1$–$C_4$-hydroxyalkyl), N($C_1$–$C_4$-hydroxyalkyl)$_2$, NH-aryl, morpholino, S—$C_1$–$C_4$-alkyl (aryl), Cl or OH; $R_3$ and $R_4$, independently, are H, $C_1$–$C_4$-alkyl, phenyl or a group of formula:

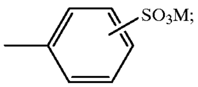

$R_5$ is H, Cl or $SO_3M$; $R_6$ is CN, $SO_3M$, S($C_1$–$C_4$-alkyl)$_2$ or S(aryl)$_2$; $R_7$ is H, $SO_3M$, O—$C_1$–$C_4$-alkyl, CN, Cl, COO—$C_1$–$C_4$-alkyl, or CON($C_1$–$C_4$-alkyl)$_2$; $R_8$ is H, $C_1$–$C_4$-alkyl, Cl or $SO_3M$; $R_9$ and $R_{10}$, independently, are H, $C_1$–$C_4$-alkyl, $SO_3M$, Cl or O—$C_1$–$C_4$-alkyl; $R_{11}$, is H or $C_1$–$C_4$-allyl; $R_{12}$ is H, $C_1$–$C_4$-alkyl, CN, Cl, COO—$C_1$–$C_4$-alkyl, CON ($C_1$–$C_4$-alkyl)$_2$, aryl or O-aryl; M is is H, Na, K, Ca, Mg, ammonium, mono-, di-, tri-, or tetra-$C_1$–$C_4$-alkylammonium, mono-, di- or tri-$C_1$–$C_4$-hydroxyalkylammonium or ammonium that is di- or tri-substituted with by a mixture of $C_1$–$C_4$-alkyl and $C_1$–$C_4$-hydroxyalkyl groups; and n is 0 or 1.

In the compounds of formulae (1) to (8), $C_1$–$C_4$-alkyl groups are, e.g., methyl, ethyl, n-propyl, isopropyl and n-butyl, especially methyl. Aryl groups are naphthyl or, especially, phenyl.

It will be appreciated that the protection afforded to the wearer of the textile material washed according to the invention will last longer when a fluorescent whitening agent is used which has a high lightfastness.

Furthermore, preferred fluorescent whitening agents for use in the present invention have a spectrum covering a relatively low wavelength range, that is exhibiting rather reddish shades. Examples of such fluorescent whitening agents include compounds of formula (1) in which $R_1$ and $R_2$ are each non-aromatic substituents, such as compounds of formula (1) in which $R_1$ and $R_2$, independently, are NH—$C_1$–$C_4$-alkyl, O—$C_1$–$C_4$-alkyl or morpholino; as well as compounds of formula (4) in which n is 1.

Preferred compounds of formula (1) are those in which $R_1$ and $R_2$, independendy, are are O-methyl, O-phenyl, $NH_2$, NH-methyl, N(methyl)$_2$, N(methyl)(hydroxyethyl), NH-ethyl, N(hydroxyethyl)$_2$, NH-phenyl, S-methyl (phenyl), Cl or OH.

Specific examples of preferred compounds of formula (1) are those having the formulae:

(9)

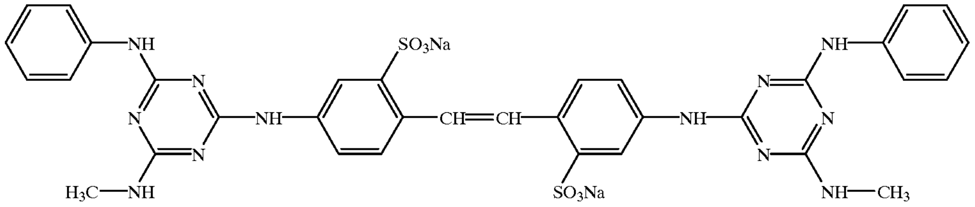

-continued
(10)
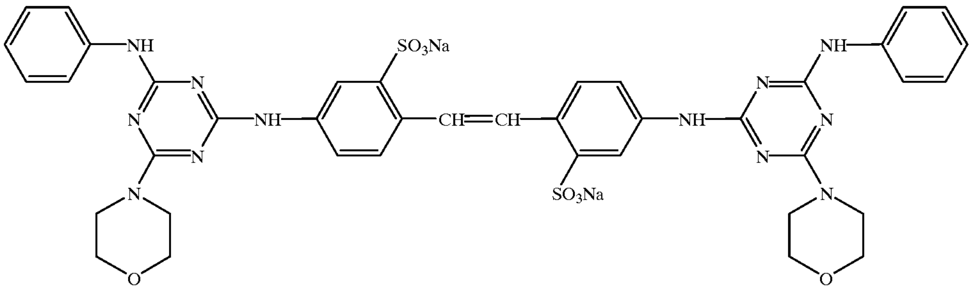
(11)
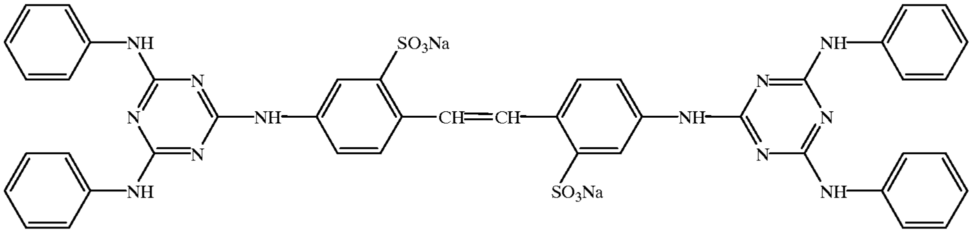
(12)
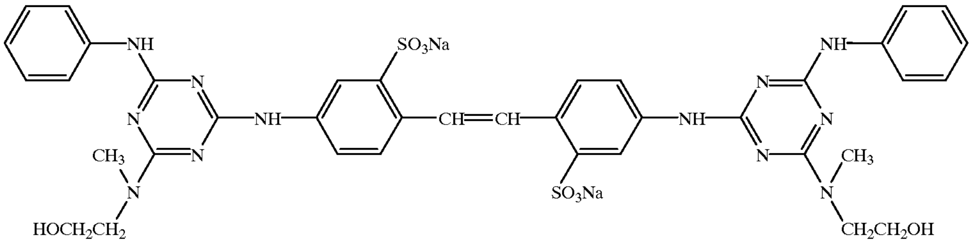
(13)
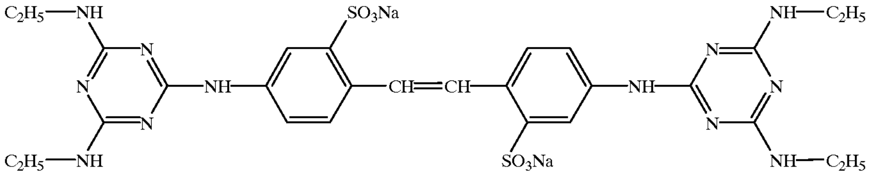
(14)
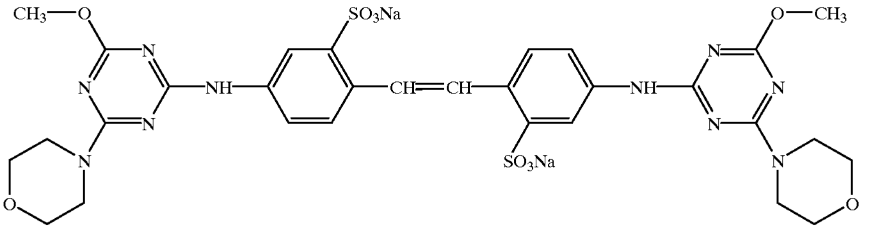
Specific preferred examples of compounds of formulas (2) and (3) are those of formulae:

(15)
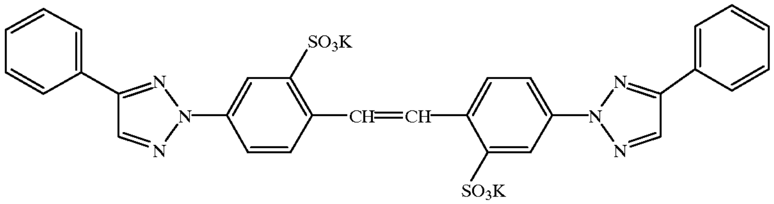
(16)
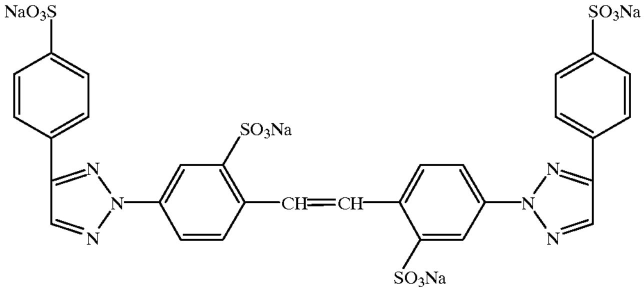
(17)
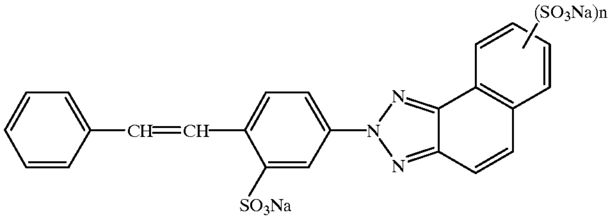
(18)
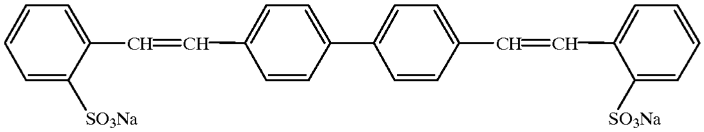
(19)
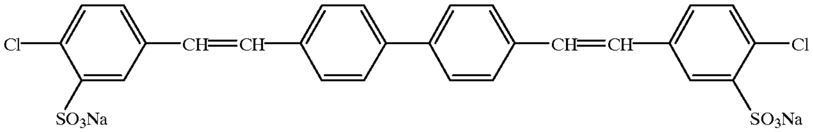
(20)
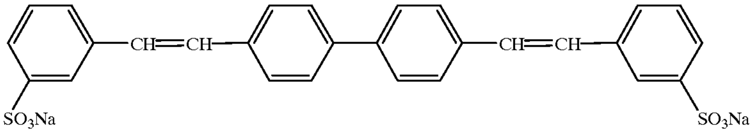
in which n has its previous significance.
Preferred examples of compounds of formula (4) are those having the formulae:
Preferred examples of compounds of formula (5) are those of formulae:
(21)
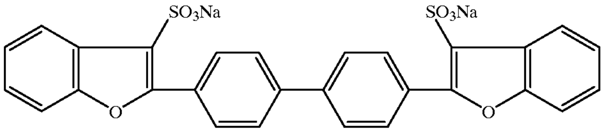

-continued (22)

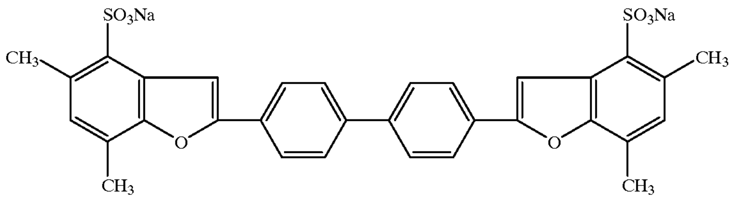

(23)

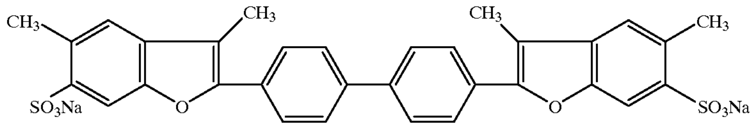

(24)

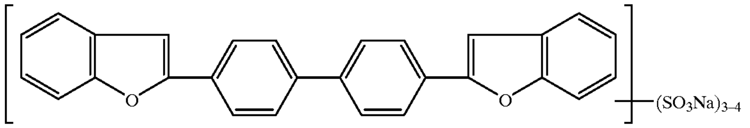

A preferred example of a compound of formula (8) is that having the formula:

(25)

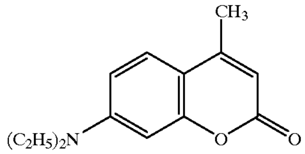

The compounds of formulae (1) to (8) are known and may be obtained by known methods.

Although most are readily water-soluble, some of the fluorescent whitening agents for use in the detergent used according to the present invention may be only sparingly soluble in water and may need to be applied in dispersed form. For this purpose, they may be milled with an appropriate dispersant, conveniently using quartz balls and an impeller, down to a particle size of 1–2 microns.

As dispersing agents for such sparingly-soluble compounds there may be mentioned:

acid esters or their salts of alkylene oxide adducts, e.g., acid esters or their salts of a polyadduct of 4 to 40 moles of ethylene oxide with 1 mole of a phenol, or phosphoric acid esters of the adduct of 6 to 30 moles of ethylene oxide with 1 mole of 4-nonylphenol, 1 mole of dinonylphenol or, especially, with 1 mole of compounds which have been produced by the addition of 1 to 3 moles of styrenes on to 1 mole of phenol;

polystyrene sulphonates;

fatty acid taurides;

alkylated diphenyloxide-mono- or -di-sulphonates;

sulphonates of polycarboxylic acid esters;

addition products of 1 to 60, preferably 2 to 30 moles of ethylene oxide and/or propylene oxide on to fatty amines, fatty amides, fatty acids or fatty alcohols, each having 8 to 22 carbon atoms, or on to tri- to hexavalent $C_3$–$C_6$alkanols, the addition products having been converted into an acid ester with an organic dicarboxylic acid or with an inorganic polybasic acid;

lignin sulphonates; and, in particular formaldehyde condensation products, e.g., condensation products of lignin sulphonates and/or phenol and formaldehyde; condensation products of formaldehyde with aromatic sulphonic acids, e.g., condensation products of ditolylethersulphonates and formaldehyde; condensation products of naphthalenesulphonic acid and/or naphthol- or naphthylaminesulphonic acids and formaldehyde; condensation products of phenolsulphonic acids and/or sulphonated dihydroxydiphenylsulphone and phenols or cresols with formaldehyde and/or urea; or condensation products of diphenyloxide-disulphonic acid derivatives with formaldehyde.

The textile fibre material washed according to the method of the present invention may be composed of any of a wide range of types of fibre such as wool, polyamide, cotton, polyester, polyacrylic, silk, polypropylene or any mixture thereof, preferably cotton, polyacrylic, silk or any mixture thereof, especially cotton.

The preferred fluorescent whitening agent for use in the detergent used according to the method of the present invention will vary depending on the fibre from which the treated fabric is composed.

Thus, for the treatment of polyester fabrics, a fluorescent whitening agent of formula (6) is preferably used. For the treatment of polyamide, a fluorescent whitening agent of formula (7), (8) or (12) is preferably used. For wool, a fluorescent whitening agent of formula (7), (8) or (15) is preferably used Relative to the use of a conventional UV absorber, the use in the present invention of a fluorescent whitening agent which absorbs radiation in the wavelength range 280–400 nm has the following advantages: easier application since it exhausts on to the fibre; coloured textile fibre material can be washed with a detergent composition according to the claimed method (previously it was generally believed that FWAs had no useful role to play in detergents for coloured goods—see, e.g., A. E. Lee "Technology developments in laundry products", Proc. of the 3rd World Conference on Detergents, Montreux, September. 1994, AOCS Press, p. 73, § "Color variants"); the UV protection is regularly renewed on washing; yellowing of the textile material caused by o-hydroxy groups in the UV absorber is avoided; minor amounts of the fluorescent whitening agent provide very high extinction values; the textile material is more wash resistant; and higher SPF values are attainable.

The method according the present invention, in addition to providing an improvement in the SPF of the washed textile material, may also increase the useful life of the textile material so washed, for example by preserving its tear strength and/or its lightfastness.

The present invention is further illustrated by the following Examples.

EXAMPLES 1 to 6

50 g of bleached, mercerised cotton swatches are washed in 1 liter of tap water (12° German hardness) containing 4 g of a detergent having the following composition (weight %):

| | |
|---|---|
| 8.0% | Sodium alkylbenzene sulfonate |
| 2.9% | Tallow alcohol-tetradecane-ethylene glycol ether (14 mols EO) |
| 3.5% | Sodium soap |
| 43.8% | Sodium tripolyphosphate |
| 7.5% | Sodium silicate |
| 1.9% | Magnesium silicate |
| 1.2% | Carboxymethyl cellulose |
| 0.2% | EDTA |
| 21.2% | Sodium sulfate |
| x% | fluorescent whitening agent (FWA) by weight on detergent Water to 100%. |

The washing is conducted at 40° C. over 15 minutes. The swatches are then rinsed under cold running tap water for 30 seconds and dried. The wash treatment is repeated three times. After the third wash, the swatches are ironed at 160° C.

The whiteness (W) of the washed samples is measured with a DCI/SF 500 spectrophotometer according to the Ganz method. The Ganz method is described in detail in the Ciba-Geigy Review, 1973/1, and also in the article "Whiteness Measurement", ISCC Conference on Fluorescence and the Colorimetry of Fluorescent Materials, Williamsburg, February 1972, published in the Journal of Color and Appearance, 1, No.5 (1972).

The Sun Protection Factor (SPF) is determined by measurement of the UV light transmitted through the swatch, using a double grating spectrophotometer fitted with an Ulbricht bowl. Calculation of SPF is conducted as described by B. L. Diffey and J. Robson in J. Soc. Cosm. Chem. 40 (1989), pp. 130–131.

The results obtained are set out in the following Table.

TABLE

| Example | FWA | Concentration FWA | W | SPF |
|---|---|---|---|---|
| — | — | — | 79 | 1.6 |
| 1 | Compound (9) | 0.2% | 211 | 6.1 |
| 2 | Compound (10) | 0.2% | 202 | 3.9 |
| 3 | Compound (14) | 0.2% | 200 | 5.2 |
| 4 | Compound (15) | 0.1% | 207 | 4.2 |
| 5 | Compound (18) | 0.1% | 201 | 3.4 |
| 6 | Compound (23) | 0.1% | 208 | 3.1 |

SPF values are the average of 3 measurements at various points on the swatches. The relative variation of the results lies within a range of from about plus or minus 10%.

Compared with the control experiment (no FWA), the SPF values obtained to the are 2–4 times higher, after only 3 washes.

EXAMPLE 7

A bleached, mercerised cotton swatch is dyed by the exhaustion method using 0.95% by weight on the fabric of a commercial blue reactive dye. The dyeing is conducted at a liquor ratio of 20:1, the temperature is raised from 25° to 100° C. over 40 minutes, and or 1 hour at 100° C. with the addition of 15 g/l of sodium sulphate, before final cold rinse.

The SPF of the dyed goods is then determined by the method described in Examples 1 to 6.

The dyed goods are then washed in the manner described in Examples 1 to 6 using the same detergent composition. The FWA compound used in the detergent is the compound of formula (18), at a level of 0.1 weight % of active substance, based on the weight of the detergent. The SPF value of the washed goods and also of goods washed with the same detergent containing no FWA (for control purposes) is determined after 1, 3, 5 and 10 washes. The results are set out in the following Table.

| Example | number of washes | SPF without fwa | SPF with fwa |
|---|---|---|---|
| — | control pre-wash | 23.7 | 23.7 |
| 7 | one | 22.5 | 23.8 |
| | three | 22.0 | 25.9 |
| | five | 20.9 | 26.9 |
| | ten | 19.8 | 28.7 |

The results in the Table demonstrate that the SPF of dyed fabrics can decrease significantly when the fabrics are washed with a detergent which does not contain an FWA. By contrast, washing with a detergent containing a compound of formula (18) not only eliminates this loss of protection against aggressive sunlight radiation, but also actually increases the SPF protection with successive washings.

What is claimed is:

1. Method for the improvement of the sun protection factor (SPF) of textile fibre material, comprising washing said textile fibre material with an effective SPF-improving amount of a detergent composition comprising at least one fluorescent whitening agent which absorbs radiation in the wavelength range of 280–400 nm, which fluorescent whitening agent is selected from the group consisting of those having one or more of the formulae:

(1)

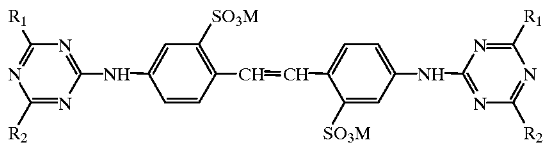

(2)

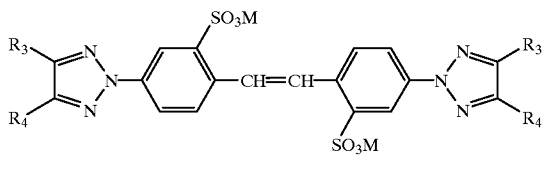

-continued (3)

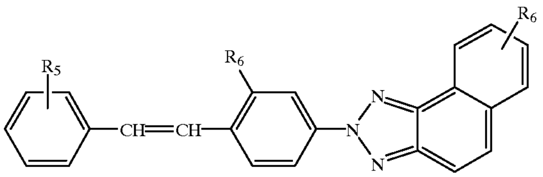

(5)

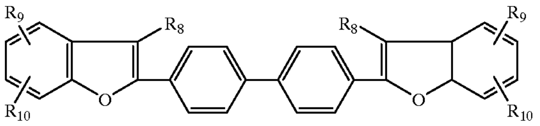

(6)

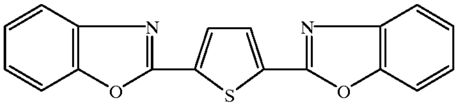

(7)

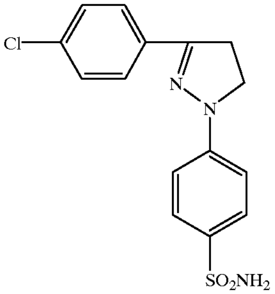

and (8)

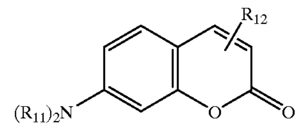

in which $R_1$ and $R_2$, independently, are OH, $NH_2$, O—$C_1$–$C_4$-alkyl, O-aryl, NH—$C_1$–$C_4$-alkyl, N($C_1$–$C_4$-alkyl)$_2$, N($C_1$–$C_4$-alkyl)($C_1$–$C_4$-hydroxyalkyl), N($C_1$–$C_4$-hydroxyalkyl)$_2$, NH-aryl, morpholino, S—$C_1$–$C_4$alkyl, S-(aryl), or Cl, with the proviso that if one of $R_1$ and $R_2$ is NH-aryl and the other is morpholino, then the compound of the formula (1) wherein one of $R_1$ and $R_2$ is NH-aryl and the other is NH—$C_1$–$C_4$-alkyl is not also present;

$R_3$ and $R_4$, independently, are H, $C_1$–$C_4$-alkyl, phenyl or a group of the formula

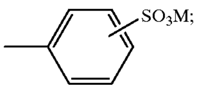

$R_5$ is H, Cl or $SO_3M$;

$R_6$ is CN, $SO_3M$, S($C_1$–$C_4$-alkyl)$_2$ or S(aryl)$_2$;

$R_8$ is H, $C_1$–$C_4$-alkyl, Cl or $SO_3M$;

$R_9$ and $R_{10}$, independently, are H, $C_1$–$C_4$-alkyl, $SO_3M$, Cl or O—$C_1$–$C_4$-alkyl;

$R_{11}$ is H or $C_1$–$C_4$-alkyl;

$R_{12}$ is H, $C_1$–$C_4$-alkyl, CN, Cl, COO—$C_1$–$C_4$-alkyl, CON($C_1$–$C_4$-alkyl)$_2$, aryl or O-aryl; and M is H, Na, K, Ca, Mg, ammonium, mono-, di-, tri- or tetra-$C_1$–$C_4$-alkylammonium, mono-, di- or tri-$C_1$–$C_4$-hydroxyalkylammonium or ammonium that is di- or tri-substituted by a mixture of $C_1$–$C_4$-alkyl and $C_1$–$C_4$-hydroxyalkyl groups, whereby the textile fibre material so washed contains 0.005 to 0.5% by weight of said fluorescent whitening agent, based on the weight of said textile fibre material and whereby the sun protection factor of the washed textile fibre material is increased relative to the untreated textile fibre material.

2. Method according to claim 1 in which the washing of the textile fibre material is conducted at least once at a temperature in the range of from 10° to 100° C.

3. Method according to claim 2 in which the washing of the textile fibre material is conducted at least once at a temperature in the range of from 15° to 60° C.

4. Method according to claim 1 in which the detergent composition used comprises:

i) 5–90% of an anionic surfactant and/or a nonionic surfactant;

ii) 5–70% of a builder;

iii) 0–30% of a peroxide;

iv) 0–10% of a peroxide activator and/or 0–1% of a bleaching catalyst;

v) 0.005–2% of said fluorescent whitening agent which absorbs radiation in the wavelength range 280–400 nm; and vi) 0.005–10% of one or more auxiliaries, each by weight, based on the total weight of the detergent.

5. Method according to claim 4 in which the detergent composition used comprises:

i) 5–70% of an anionic surfactant and/or a nonionic surfactant;

ii) 5–40% of a builder;

iii) 1–12% of a peroxide;

iv) 1–6% of a peroxide activator and/or 0.1–3% of a bleaching catalyst;

v) 0.01–1% of said fluorescent whitening agent which absorbs radiation in the wavelength range 280–400 nm; and v) 0.1–5% of one or more auxiliaries, each by weight, based on the total weight of the detergent.

6. Method according to claim 1 in which the washed textile material contains 0.01 to 0.2% by weight of the fluorescent whitening agent, based on the weight of the textile material.

7. Method according to claim 1 in which the fluorescent whitening agent has the formula (1) and $R_1$ and $R_2$, independently, are non-aromatic substituents.

8. Method according to claim 1 in which the fluorescent whitening agent has the formula (1) and $R_1$ and $R_2$, independendy, are NH—$C_1$–$C_4$-alkyl, O—$C_1$–$C_4$-alkyl or morpholino.

9. Method according to claim 1 in which the fluorescent whitening agent has the formula (1) and $R_1$ and $R_2$, independently, are are O-methyl, O-phenyl, $NH_2$, NH-methyl, N(methyl)$_2$, N(methyl)(hydroxyethyl), NH-ethyl, N(hydroxyethyl)$_2$, NH-phenyl, S-methyl, S-(phenyl), Cl or OH.

10. Method according to claim 1 in which the fluorescent whitening agent has the formula (9)
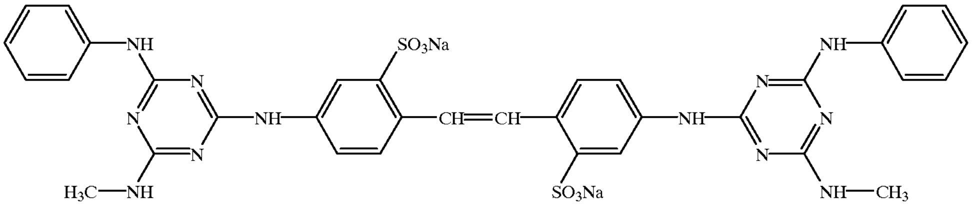
(10)
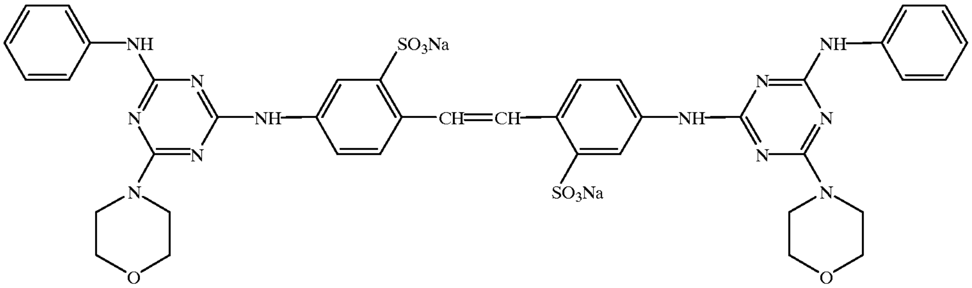
(11)
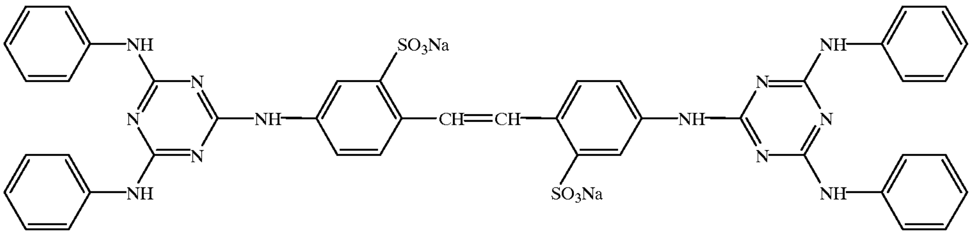
(12)
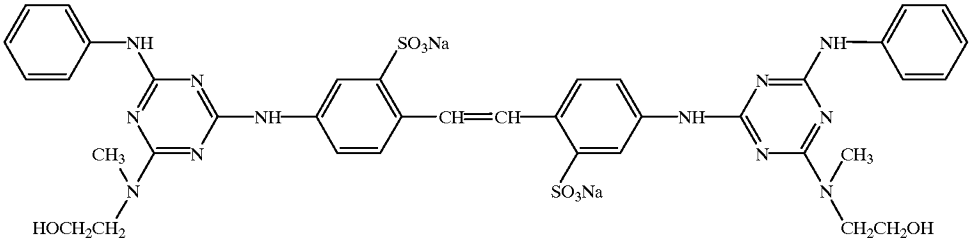
(13)
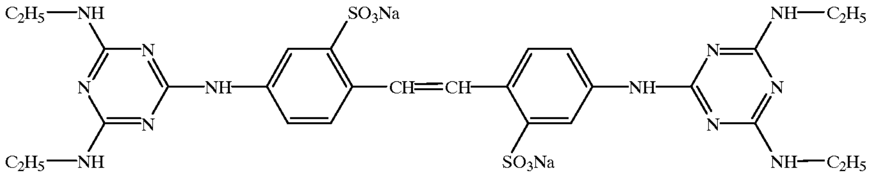
or
(14)
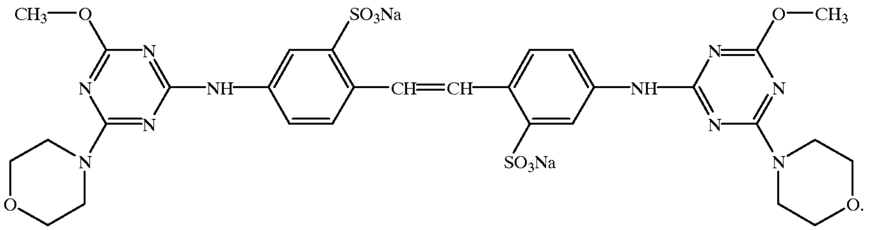
11. Method according to claim 1 in which the fluorescent whitening agent has the formula:

(15)
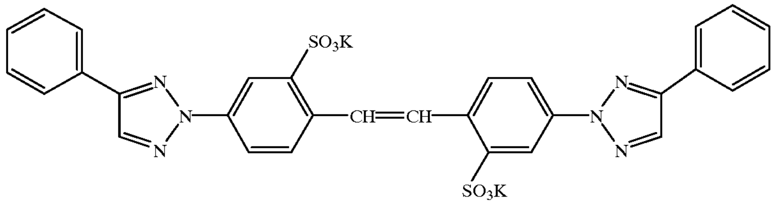
(16)
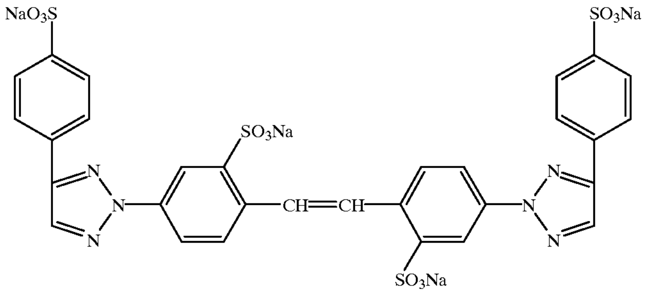
or
(17)
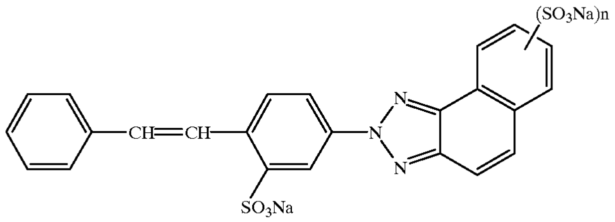
in which n is 0 or 1.
12. Method according to claim 1 in which the fluorescent whitening agent of formula (5) has the formula:
(21)
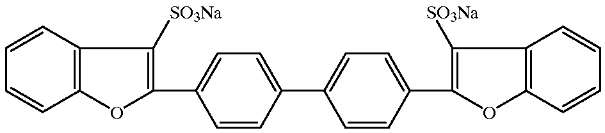
(22)
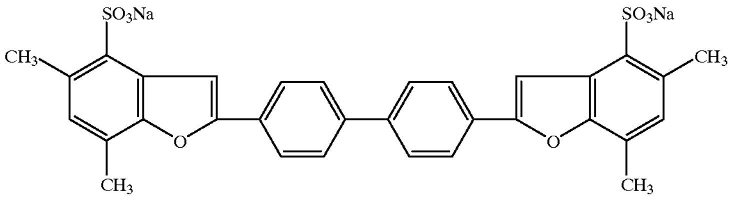
(23)
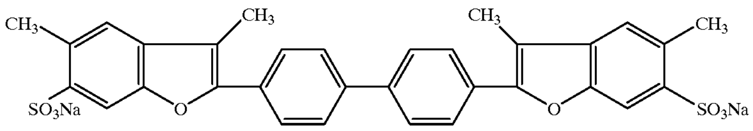
or -continued (24)

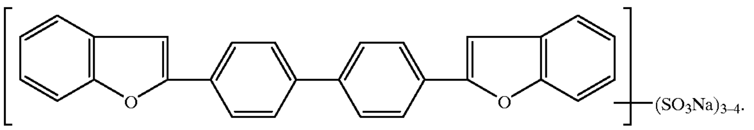

13. Method according to claim 1 in which the fluorescent whitening agent of formula (8) has the formula:

(25)

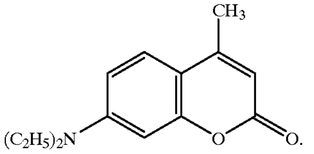

14. Method according to claim 1 in which the textile fibre material is composed of wool, polyamide, cotton, polyester, polyacrylic, silk or any mixture thereof.

15. Method according to claim 14 in which the fibre material is composed of cotton, polyacrylic, silk or any mixture thereof.

16. Method according to claim 15 in which the fibre material is composed of cotton.

17. Method according to claim 1 in which the textile fibre material is composed of polyester and a fluorescent whitening agent of formula (6) is used.

18. Method according to claim 1 in which the textile fibre material is composed of polyamide and a fluorescent whitening agent of formula (7), (8)

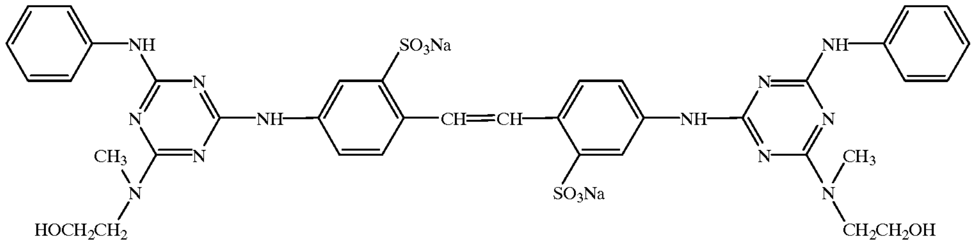

or (12) is used.

19. Method according to claim 1 in which the textile fibre material is composed of wool and a fluorescent whitening agent of formula (7), (8)

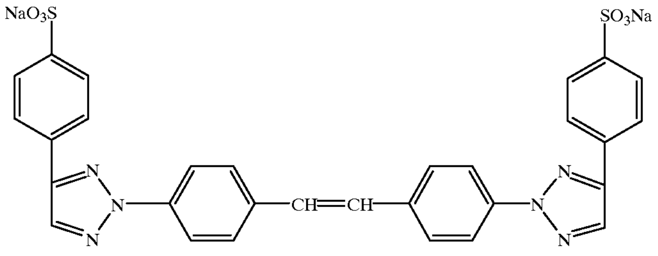

or (16) is used.

20. Textile fibre material having an improved sun protection factor when washed according to the method claimed in claim 1.

* * * * *